United States Patent
Fujita et al.

(10) Patent No.: US 11,375,353 B2
(45) Date of Patent: Jun. 28, 2022

(54) OCCUPANCY-BASED ADJUSTMENT OF COMMUNICATION BASED ON ID COUNT VALUES

(71) Applicant: RENESAS ELECTRONICS CORPORATION, Tokyo (JP)

(72) Inventors: Suguru Fujita, Tokyo (JP); Hiroshi Chano, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 120 days.

(21) Appl. No.: 16/851,936

(22) Filed: Apr. 17, 2020

(65) Prior Publication Data

US 2020/0374675 A1    Nov. 26, 2020

(30) Foreign Application Priority Data

May 20, 2019    (JP) .............................. JP2019-094401

(51) Int. Cl.
*H04W 4/46*    (2018.01)

(52) U.S. Cl.
CPC .................................... *H04W 4/46* (2018.02)

(58) Field of Classification Search
CPC .......... H04W 4/46; H04W 4/48; H04W 4/02; H04W 4/021; H04W 4/027; H04W 4/40; H04W 4/44; H04W 4/80; H04W 56/0045
See application file for complete search history.

(56) References Cited

U.S. PATENT DOCUMENTS

| | | | |
|---|---|---|---|
| 6,603,738 B1 * | 8/2003 | Kari ...................... | H04W 28/02 370/230.1 |
| 9,931,953 B2 | 4/2018 | Oshida et al. | |
| 2014/0192819 A1 * | 7/2014 | Nishimura ............ | H04L 47/621 370/412 |
| 2018/0167330 A1 | 6/2018 | Grover | |

FOREIGN PATENT DOCUMENTS

| | | |
|---|---|---|
| EP | 0 886 938 A1 | 12/1998 |
| JP | 2015-156776 A | 8/2015 |

OTHER PUBLICATIONS

Extended European Search Report issued in corresponding European Patent Application No. 20175309.2-1213, dated Oct. 14, 2020.

* cited by examiner

*Primary Examiner* — Philip Sobutka

(74) *Attorney, Agent, or Firm* — McDermott Will & Emery LLP

(57) ABSTRACT

A radio communication device includes an application execution unit which generates first transmission data including first application identification information, a communication unit which receives a message including first reception data including the first application identification information, and an occupancy rate determination unit including a transmission ID number counter which counts the number of first application identification information included in the first transmission data and which outputs a count result as a first transmission ID count value, a reception ID number counter which counts the number of first application identification information included in the first reception data and which outputs a count result as a first reception ID count value, and a comparison unit which compares the first transmission ID count value with the first reception ID count value to determine the number of trans- (Continued)

mission data and the number of reception data have a predetermined ratio.

15 Claims, 10 Drawing Sheets

FIG. 4

| | TRANSMISSION ID COUNT VALUE | RECEPTION ID COUNT VALUE | TRANSMISSION ID APPROPRIATE RATIO | RECEPTION ID APPROPRIATE RATIO | CONTROL OF COMMUNICATION FREQUENCY |
|---|---|---|---|---|---|
| FOLLOWING APPLICATION | 10 | 9 | 1 | 2 | INCREASE |
| NON-LINE-OF-SIGHT APPLICATION | 100 | 90 | 5 | 5 | DECREASE |

OCCUPANCY-BASED ADJUSTMENT OF COMMUNICATION BASED ON ID COUNT VALUES

CROSS-REFERENCE TO RELATED APPLICATIONS

The disclosure of Japanese Patent Application No. 2019-094401 filed on May 20, 2019 including the specification, drawings and abstract is incorporated herein by reference in its entirety.

BACKGROUND

The present disclosure relates to a radio communication device and a radio communication system.

Techniques for performing vehicle-to-vehicle communication, road-to-vehicle communication, and road-to-road communication using radio communication devices and radio communication systems are known in order to perform safe driving support and automated driving.

There are disclosed techniques listed below.
[Patent Document 1] Japanese Unexamined Patent Application Publication No. 2015-156776

For example, Patent Document 1 discloses a technique in which a charging spot obtains product information of an electronic device left in a vehicle using a radio communication system, and power is supplied to the vehicle based on the obtained product information.

Specifically, the vehicle receives the encrypted product information from the electronic device left behind in the vehicle, and transmits the received product information to the charging spot. The charging spot acquires a common key from the manufacturer side of the electronic device via a network. The charging spot decrypts the product information transmitted from the vehicle using the obtained common key. The charging spot identifies the electronic device left in the vehicle from the decrypted product information, and controls power supplied to the vehicle based on an allowable current value of the identified electronic device.

SUMMARY

As described above, in radio communication systems of Patent Document 1, a plurality of applications is activated in a plurality of radio communication devices mounted on vehicles, electronic devices, and charging spots, and various types of radio communication are performed. A plurality of the radio communication devices and the applications identify data to be transmitted and received using methods of identifying the respective radio communication systems. As a result, necessary data is read in the own device, and unnecessary data is discarded. In this manner, communication of the radio communication device and the application is established.

However, as the number of applications mounted on a radio communication device, radio communication devices constituting a radio communication system, and radio communication systems conforming to the same radio communication standard increases, there is a possibility that stable communication cannot be performed in an active application. For example, when a specific application occupies many communication resources, another application cannot secure sufficient communication resources.

Other objects and novel features will be apparent from the description of this specification and the accompanying drawings.

A radio communication device according to one embodiment includes an application execution unit which generates first transmission data including first application identification information, a communication unit which receives a message including first reception data including the first application identification information, and an occupancy rate determination unit including a transmission ID number counter which counts the number of first application identification information included in the first transmission data and which outputs a count result as a first transmission ID count value, a reception ID number counter which counts the number of first application identification information included in the first reception data and which outputs a count result as a first reception ID count value, and a comparison unit which compares the first transmission ID count value with the first reception ID count value to determine the number of transmission data and the number of reception data have a predetermined ratio.

According to one embodiment, stable communication can be achieved even if applications installed in the radio communication device, the radio communication devices constituting the radio communication system, and the radio communication systems conforming to the same radio communication standard are increased.

BRIEF DESCRIPTION OF THE DRAWINGS

FIG. 4 is a diagram showing an example of an operation of the radio communication device according to the first embodiment.

DETAILED DESCRIPTION

Figure 1:
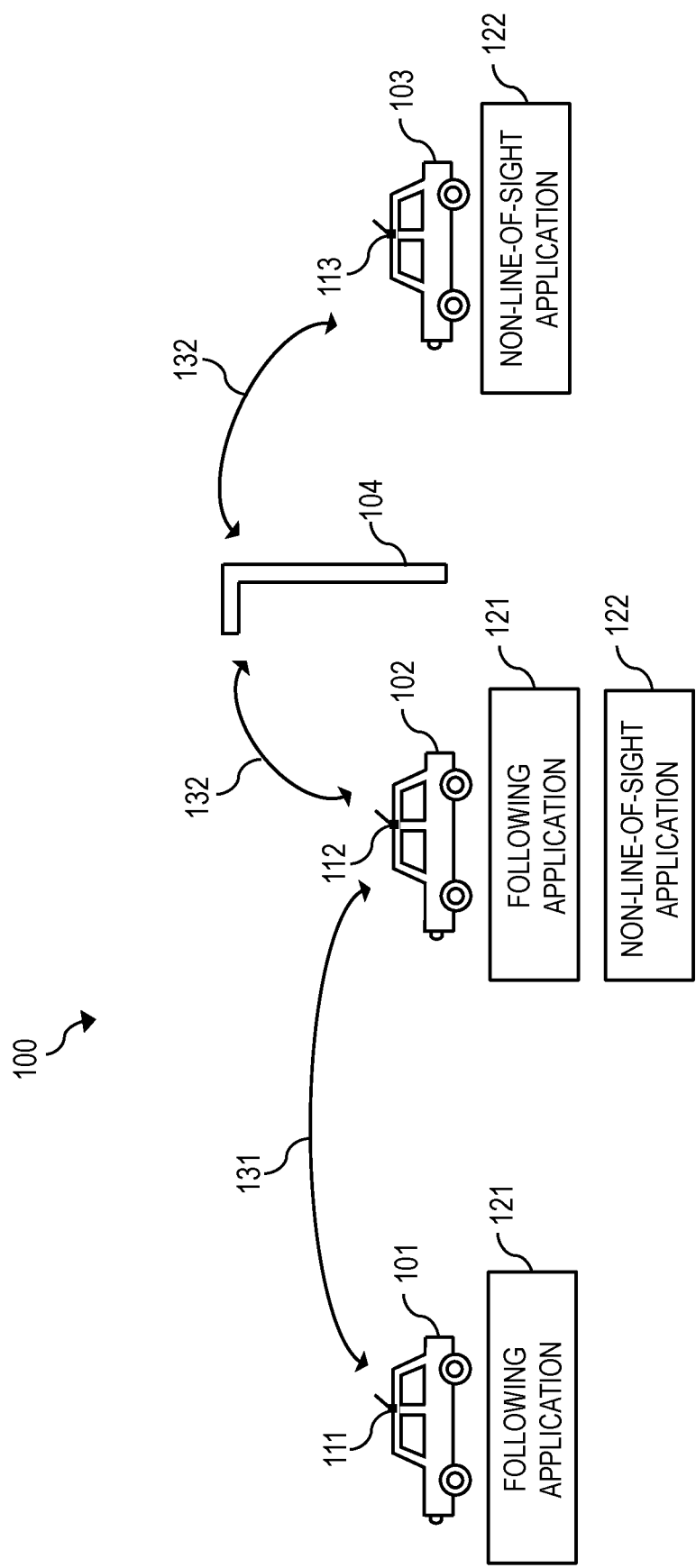
FIG. 1 is a diagram showing an example of a configuration of a radio communication system according to a first embodiment.

Hereinafter, embodiments will be described in detail with reference to the drawings. In the specification and the drawings, the same or corresponding components are denoted by the same reference numerals, and a repetitive description thereof is omitted. In the drawings, for convenience of description, the configuration may be omitted or simplified. Also, each of the embodiments may be arbitrarily combined with at least some of the other embodiments.

First Embodiment

FIG. 1 is a diagram showing an example of a configuration of a radio communication system 100 according to a first embodiment. As shown in FIG. 1, the radio communication system 100 includes a vehicle 101, a vehicle 102, a vehicle 103, and a roadside device 104. A radio communication device 111 is mounted on the vehicle 101. A radio communication device 112 is mounted on the vehicle 102. A radio communication device 113 is mounted on the vehicle 103. Vehicle 101, the vehicle 102 and the vehicle 103 transmit and receive messages from each other using the radio communication device mounted on each.

Vehicle 101 and vehicle 102 are traveling in the same direction, with vehicle 101 leading and vehicle 102 following. In the vehicle 101 and the vehicle 102, a preceding vehicle following application 121 is activated. Hereinafter, the preceding vehicle following application is referred to as a following application. The vehicle 101 and the vehicle 102 exchange vehicle-to-vehicle messages 131 including first vehicle information using the radio communication device mounted on each. The first vehicle information is, for example, the speed, acceleration, deceleration, or modification in the traveling direction of the own vehicle. By exchanging the vehicle-to-vehicle messages 131 including the first vehicle information, the vehicle 102 can follow the vehicle 101 at predetermined intervals.

The vehicle 102 and the vehicle 103 are out of line of sight. In the vehicle 102 and the vehicle 103, a non-line-of-sight vehicle warning application 122 is activated. Hereinafter, the non-line-of-sight vehicle warning application is referred to as a non-line-of-sight application. The vehicle 102 and the vehicle 103 exchange road-to-vehicle messages 132 including second vehicle information via the roadside device 104 using the radio communication device mounted on each. The second vehicle information is, for example, the speed, the traveling direction, or the coordinates of the own vehicle. By exchanging the road-to-vehicle messages 132 including the second vehicle information, the vehicle 102 and the vehicle 103 can output an approach warning indicating that the vehicles are approaching each other by a predetermined interval, for example, to on-vehicle monitors.

In the radio communication system 100 of FIG. 1, the following application 121 and the non-line-of-sight application 122 are activated at the same time. In the case where a plurality of applications coexists in the radio communication system as described above, if a specific application uses many communication resources, other applications cannot secure sufficient communication resources, and stable communication cannot be performed. Hereinafter, a mechanism for detecting a situation in which a specific application uses much of communication and improving the situation will be described.

Figure 2:
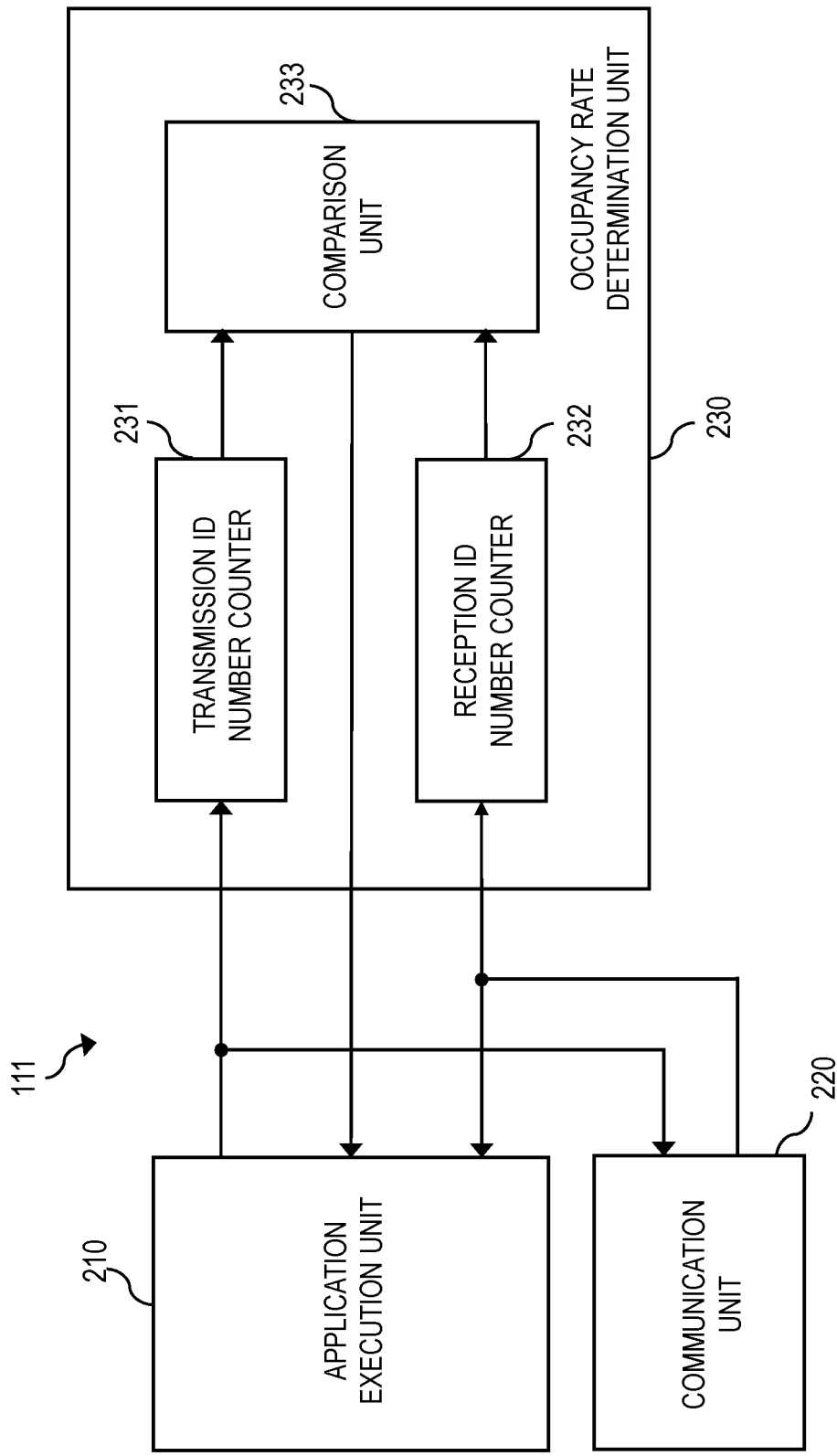
FIG. 2 is a block diagram showing an example of a configuration of the radio communication device according to the first embodiment.

FIG. 2 is a block diagram showing an example of a configuration of the radio communication device 111 according to the first embodiment. Since the radio communication device 111, the radio communication device 112, and the radio communication device 113 have the same configuration, only the configuration of the radio communication device 111 will be described here. As shown in FIG. 2, the radio communication device 111 includes an application execution unit 210, a communication unit 220, and an occupancy rate determination unit 230. The application execution unit 210, the communication unit 220, and the occupancy rate determination unit 230 are connected to each other.

The application execution unit 210 executes an application. A plurality of applications may be executed. For example, in the radio communication system 100 of FIG. 1, the following application 121 is activated by the vehicles 101 and 102, and the non-line-of-sight application 122 is activated by the vehicle 102 and the vehicle 103. Therefore, the application execution unit 210 of the radio communication device 111 executes the following application 121. The application execution unit 210 of the radio communication device 112 executes the following application 121 and the non-line-of-sight application 122. The application execution unit 210 of the radio communication device 113 executes the non-line-of-sight application 122.

The application execution unit 210 executes an application to generate transmission data. The generated transmission data is output to the communication unit 220 and the occupancy rate determination unit 230. The transmission data includes an application IDentification (ID) and a main data. The application ID is application identification information for indicating which application has been executed to generate transmission data. That is, the application ID, which is the application identification information, is information for specifying an application related to the transmission data including the application ID. For example, the transmission data generated by the execution of the following application 121 includes the following application ID as the application ID. The following application ID indicates that the transmission data including the following application ID is data related to the following application 121. On the other hand, the transmission data generated by executing the non-line-of-sight application 122 includes the non-line-of-sight application ID as the application ID. The non-line-of-sight application ID indicates that the transmission data including the non-line-of-sight application ID is data related to the non-line-of-sight application 122. The main data is the data itself to be transmitted to another vehicle serving as a transmission destination. For example, the transmission data generated by the execution of the following application 121 includes the first vehicle information. On the other hand, the transmission data generated by the execution of the non-line-of-sight application 122 includes the second vehicle information.

The application execution unit 210 receives reception data from the communication unit 220. The reception data includes the application ID and the main data. Similar to the transmission data described above, the application ID, which is the application identification information, is information for specifying an application related to the reception data including the application ID. The application execution unit 210 determines whether or not the reception data is addressed to itself by referring to the application ID included in the reception data. For example, when the reception data received by the application execution unit 210 of the radio communication device 111 includes the following application ID, the application execution unit 210 of the radio communication device 111 determines that the reception data is directed to itself, and receives the reception data. On the other hand, if the reception data received by the application execution unit 210 of the radio communication device 111 includes the out of line-of-sight application ID, the application execution unit 210 of the radio communication device 111 determines that the reception data is not directed to itself, and discards the reception data.

The communication unit 220 receives the transmission data from the application execution unit 210. The communication unit 220 generates a message including the received transmission data, and transmits the generated message to another vehicle. For example, the communication unit 220 of the radio communication device 111 and the communication unit 220 of the radio communication device 112 transmit the vehicle-to-vehicle messages 131 including the following application IDs and the transmission data including the first vehicle information (hereinafter, also referred to as following application transmission data). On the other hand, the communication unit 220 of the radio communication device 112 and the communication unit 220 of the radio communication device 113 transmit the road-to-vehicle messages 132 including the non-line-of-sight application IDs and the transmission data including the second vehicle information (hereinafter, also referred to as non-line-of-sight application transmission data).

In addition, the communication unit 220 receives a message from another vehicle. For example, the communication unit 220 of the radio communication device 111 and the communication unit 220 of the radio communication device 112 receive the vehicle-to-vehicle messages 131 including the following application IDs and the reception data including the first vehicle information (hereinafter, also referred to as a following application reception data). On the other hand, the communication unit 220 of the radio communication device 112 and the communication unit 220 of the radio communication device 113 receive the road-to-vehicle messages 132 including the non-line-of-sight application IDs and the reception data including the second vehicle information (hereinafter, also referred to as a non-line-of-sight application reception data). The communication unit 220 extracts reception data from the received message, and outputs the extracted reception data to the application execution unit 210 and the occupancy rate determination unit 230.

The occupancy rate determination unit 230 includes a transmission ID number counter 231, a reception ID number counter 232, and a comparison unit 233. The transmission ID number counter 231 and the reception ID number counter 232 are connected to the comparison unit 233.

The transmission ID number counter 231 receives transmission data from the application execution unit 210. The transmission ID number counter 231 counts the application ID included in the transmission data for each application. For example, since the following application 121 is executed in the radio communication device 111, the transmission ID number counter 231 of the radio communication device 111 counts the number of following application IDs included in the transmission data. Since the following application 121 and the non-line-of-sight application 122 are executed In the radio communication device 112, the transmission ID number counter 231 of the radio communication device 112 separately counts the number of following application IDs and the number of non-line-of-sight application IDs included in the transmission data. Since the non-line-of-sight application 122 is executed in the radio communication device 113, the transmission ID number counter 231 of the radio communication device 113 counts the number of non-line-of-sight application IDs included in the transmission data. The transmission ID number counter 231 outputs the result of counting the application IDs included in the transmission data, that is, the transmission ID count value to the comparison unit 233.

The reception ID number counter 232 receives reception data from the communication unit 220. The reception ID number counter 232 counts the application ID included in the reception data for each application. For example, since the following application 121 is executed in the radio communication device 111, the reception ID number counter 232 of the radio communication device 111 counts the number of following application IDs included in the reception data. Since the following application 121 and the non-line-of-sight application 122 are executed in the radio communication device 112, the reception ID number counter 232 of the radio communication device 112 separately counts the number of following application IDs and the number of non-line-of-sight application IDs included in the reception data. Since the non-line-of-sight application 122 is executed in the radio communication device 113, the reception ID number counter 232 of the radio communication device 113 counts the number of non-line-of-sight application IDs included in the reception data. The reception ID number counter 232 outputs the result of counting the application IDs included in the reception data, that is, the reception ID count value to the comparison unit 233.

Figure 3:
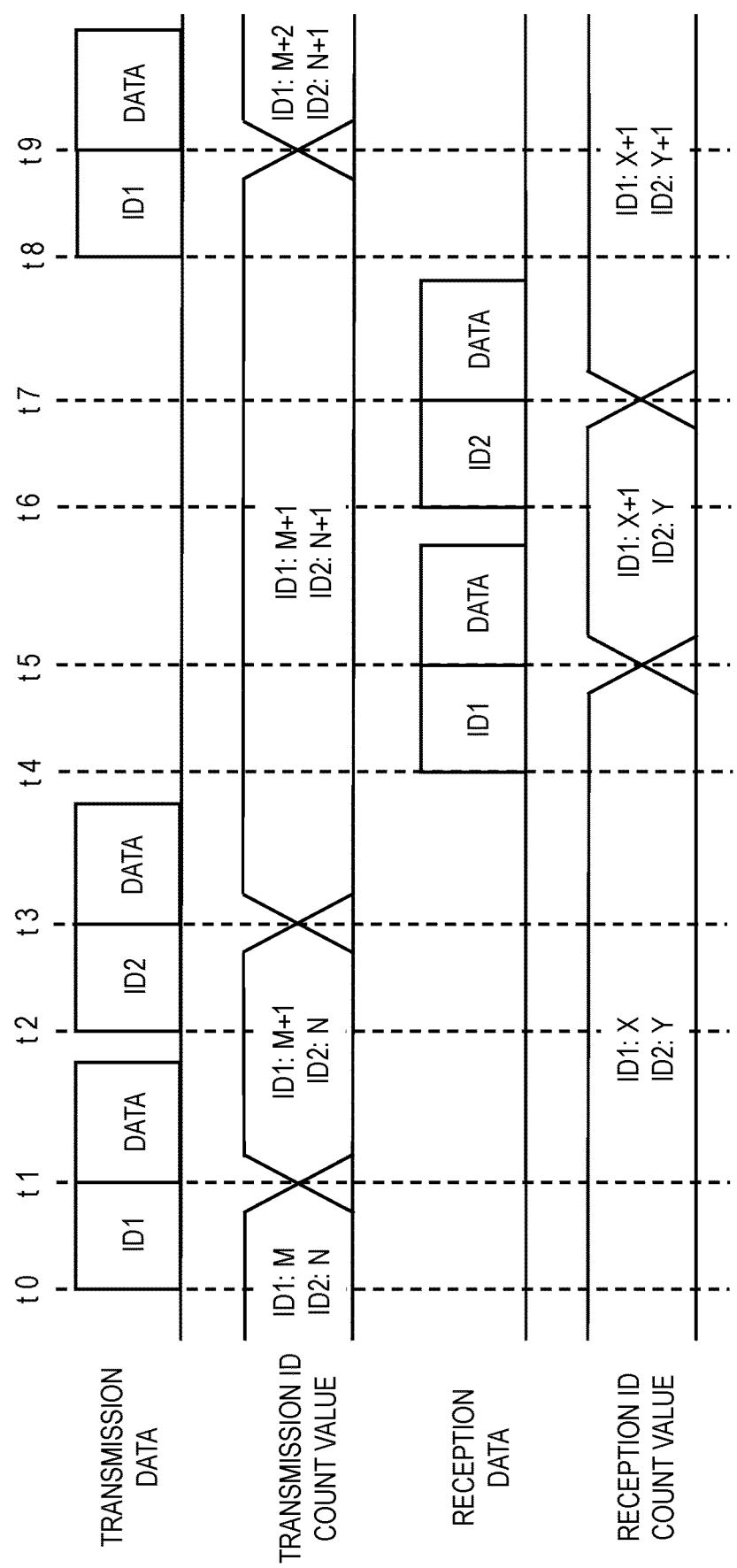
FIG. 3 is a timing chart showing an example of an operation of the radio communication device according to the first embodiment.

FIG. 3 is a timing chart showing an example of an operation of the transmission ID number counter 231 and the reception ID number counter 232 of the radio communication device 112 according to the first embodiment. Here, only the radio communication device 112 will be described, but the radio communication device 111 and the radio communication device 113 operate in the same manner, although there is a difference between the transmission data and the reception data. The lateral direction in FIG. 3 corresponds to time. The vertical direction in FIG. 3 represents the timing at which the digital data signal (0/1) indicating the transmission data, the transmission ID count value, the reception data, and the reception ID count value changes. In addition, ID1 indicates the following application ID, ID2 indicates the non-line-of-sight application ID, and data indicates the main data. Therefore, the transmission data including ID1 indicates the following application transmission data, and the reception data including ID1 indicates the following application reception data. The transmission data including ID2 indicates the non-line-of-sight application transmission data, and the reception data including ID2 indicates the non-line-of-sight application reception data.

As shown in FIG. 3, at a timing t0, the application execution unit 210 starts outputting the following application transmission data. At this time, the transmission ID count value of the transmission ID number counter 231 is "M" for the following application ID and "N" for the non-line-of-sight application ID, and the reception ID count value of the reception ID number counter 232 is "X" for the following application ID and "Y" for the non-line-of-sight application ID. At a timing t1, the transmission ID number counter 231 completes the reception of the following application ID, and sets the transmission ID count value for the following application ID to "M+1".

At a timing t2, the application execution unit 210 starts outputting the non-line-of-sight application transmission data. At a timing t3, the transmission ID number counter 231 completes the reception of the non-line-of-sight application ID, and sets the transmission ID count value for the non-line-of-sight application ID to "N+1".

At a timing t4, the communication unit 220 starts outputting the following application reception data. At a timing t5, the reception ID number counter 232 completes the reception of the following application ID, and sets the reception ID count value for the following application ID to "X+1".

At a timing t6, the communication unit 220 starts outputting the non-line-of-sight application reception data. At a timing t7, the reception ID number counter 232 completes the reception of the non-line-of-sight application ID, and sets the reception ID count value for the non-line-of-sight application ID to "Y+1".

At a timing t8, the application execution unit 210 starts outputting the following application transmission data again. At a timing t9, the transmission ID number counter 231 completes the reception of the following application ID, and sets the transmission ID count value for the following application ID to "M+2".

Returning to FIG. 2, the configuration of the radio communication device 111 will be described. The comparison unit 233 receives the transmission ID count value from the transmission ID number counter 231 and the reception ID count value from the reception ID number counter 232. The comparison unit 233 compares, for each application, the transmission ID count value with the reception ID count value, and determines whether the number of transmission data and the number of reception data for each application have a predetermined ratio. Specifically, the determination is made based on, for example, whether or not the ratio of the number of transmission data and the number of reception data for each application falls within the range of the appropriate ratio. When the number of transmission data and the number of reception data for each application do not have the predetermined ratio, the comparison unit 233 determines the communication occupancy rate of the application on the assumption that the occupancy rate of the application to the communication resource is high or low. The comparison unit 233 outputs the determination result to the application execution unit 210 as an occupancy ratio determination result. The application execution unit 210 can adjust the communication frequency based on the occupancy rate determination result.

Further, when the ratio between the transmission ID count value (the number of transmission data) and the reception ID count value (the number of reception data) do not have the predetermined ratio because the transmission ID count value is larger than the reception ID count value, the comparison unit 233 determines that the occupation ratio of the application to the communication resource is high. The comparison unit 233 can also include the control of decreasing the communication frequency of the application determined to have the high occupancy rate in the occupancy rate determination result and output the result to the application execution unit 210. The application execution unit 210 decreases the communication frequency of the application determined to have the high occupancy rate, thereby releasing communication resources for other applications in the radio communication system 100.

On the other hand, when the ratio between the transmission ID count value and the reception ID count value do not have the predetermined ratio because the reception ID count value is larger than the transmission ID count value, the comparison unit 233 determines that the occupation ratio of the application to the communication resource is low. The comparison unit 233 can also include control of raising the communication frequency of the application determined to have the low occupancy rate in the occupancy rate determination result and output the result to the application execution unit 210. The application execution unit 210 increases the communication frequency of the application determined to have the low occupancy rate, thereby securing sufficient communication resources for the applications and the effective communication can be performed in the radio communication system 100.

In the radio communication system 100 of FIG. 1, the radio communication device 111 executes the following application 121. Therefore, in the radio communication device 111, the communication occupancy rate for the following application 121 is determined, and the communication frequency of the following application 121 is adjusted based on the determination result. Specifically, the comparison unit 233 of the radio communication device 111 compares the transmission ID count value and the reception ID count value of the following application 121, and determines whether the number of transmission data and the number of reception data of the following application 121 have a predetermined ratio. The application execution unit 210 adjusts the communication frequency of the following application 121 based on the occupancy rate determination result by the comparison unit 233. When it is determined that the occupancy rate of the following application 121 is high, the application execution unit 210 performs control so as to decrease the communication frequency of the following application 121. Conversely, when it is determined that the occupancy rate of the following application 121 is low, the application execution unit 210 performs control so as to increase the communication frequency of the following application 121.

In addition, the same processing as that of the radio communication device 111 is performed for the radio communication device 112 and the radio communication device 113 except that the application to be processed differs. That is, since the radio communication device 112 executes the following application 121 and the non-line-of-sight application 122, the radio communication device 112 determines the communication occupancy rates for the following application 121 and the non-line-of-sight application 122, and adjusts the communication frequencies of the following application 121 and the non-line-of-sight application 122 based on the determination results. Since the radio communication device 113 executes the non-line-of-sight application 122, the radio communication device 113 determines the communication occupancy rate for the non-line-of-sight application 122 and adjusts the communication frequency of the non-line-of-sight application 122 based on the determination result.

In the radio communication device 112, since the transmission ID and the reception ID are counted for the two applications, i.e., the following application 121 and the non-line-of-sight application 122, the communication frequency of the application can be adjusted based on comparing the transmission ID and the reception ID between the applications. FIG. 4 is a diagram showing an example of an operation of the occupancy rate determination unit 230 of the radio communication device 112 according to the first embodiment. FIG. 4 shows the transmission ID count value, the reception ID count value, the transmission ID appropriate ratio, the reception ID appropriate ratio, and the control of the communication frequency for each of the following application 121 and the non-line-of-sight application 122.

As shown in FIG. 4, since the transmission ID count value of the following application 121 is 10 and the transmission ID count value of the non-line-of-sight application 122 is 100, the transmission ID ratio between the following application 121 and the non-line-of-sight application 122 is 10:100, that is, 1:10. On the other hand, the transmission ID appropriate ratio between the following application 121 and the non-line-of-sight application 122 is 1:5. Since the reception ID count value of the following application 121 is 9 and the reception ID count value of the non-line-of-sight application 122 is 90, the reception ID ratio between the following application 121 and the non-line-of-sight application 122 is 9:90, that is, 1:10. On the other hand, the reception ID appropriate ratio between the following application 121 and the non-line-of-sight application 122 is 2:5.

Comparing the transmission ID ratio and the reception ID ratio between the following application 121 and the non-line-of-sight application 122 with the respective appropriate ratios, it can be seen that the communication ratio of the following application 121 is low and the communication ratio of the non-line-of-sight application 122 is high. Based on this result, control is performed to increase the communication frequency of the following application 121, and control is performed to decrease the communication frequency of the non-line-of-sight application 122. That is, the comparison unit 233 compares the transmission ID count value and the reception ID count value between the following application 121 and the non-line-of-sight application 122, respectively, and determines whether or not the number of transmission data and the number of reception data between the following application 121 and the non-line-of-sight application 122, respectively, have predetermined ratios. The comparison unit 233 includes the determination result in the occupancy rate determination result and outputs the result. The application execution unit 210 adjusts the communication frequency of the following application 121 or the non-line-of-sight application 122 based on the occupancy ratio determination result, that is, the result of determining whether the number of transmission data and the number of reception data between the following application 121 and the non-line-of-sight application 122 have the predetermined ratios, respectively. In this manner, by comparing the transmission ID count value and the reception ID count value between a plurality of applications, the communication frequency of the plurality of applications can be adjusted.

In the above description, the radio communication device conforming to one radio communication standard is used. However, for example, by using a signal of another radio communication standard having a different radio frequency band, communication resources may be increased, and a necessary amount of communication may be secured.

As described above, according to first embodiment, the application execution unit 210 executes one or a plurality of applications, and outputs the transmission data including the application identification information for each application. The communication unit 220 receives a message having reception data including application identification information from another vehicle, and outputs reception data including application identification information. The transmission ID number counter 231 counts the number of application identification information included in the transmission data for each application. In other words, the transmission ID number counter 231 counts the number of transmission data according to application for each application. On the other hand, the reception ID number counter 232 counts the number of application identification information included in the reception data for each application. In other words, the reception ID number counter 232 counts the number of reception data according to application for each application. The comparison unit 233 compares the transmission ID count value, which is the count result by the transmission ID number counter 231, with the reception ID count value, which is the count result by the reception ID number counter 232, for each application, and determines whether the number of transmission data and the number of reception data according to the application have a predetermined ratio.

The application execution unit 210 can adjust the communication frequency of the application to be executed based on the determination result by the comparison unit 233. For example, when it is determined that the ratio between the transmission ID count value (the number of transmission data) and the reception ID count value (the number of reception data) of the application being executed does not have the predetermined ratio, the application execution unit 210 executes control to decrease the transmission frequency of the application being executed or to increase the transmission frequency of the application being executed. This releases communication resources for other applications, or ensures sufficient communication resources for the application being executed. This enables stable communication even if applications installed in the radio communication device, the radio communication devices constituting the radio communication system, and the radio communication systems conforming to the same radio communication standard are increased.

Second Embodiment

Figure 5:
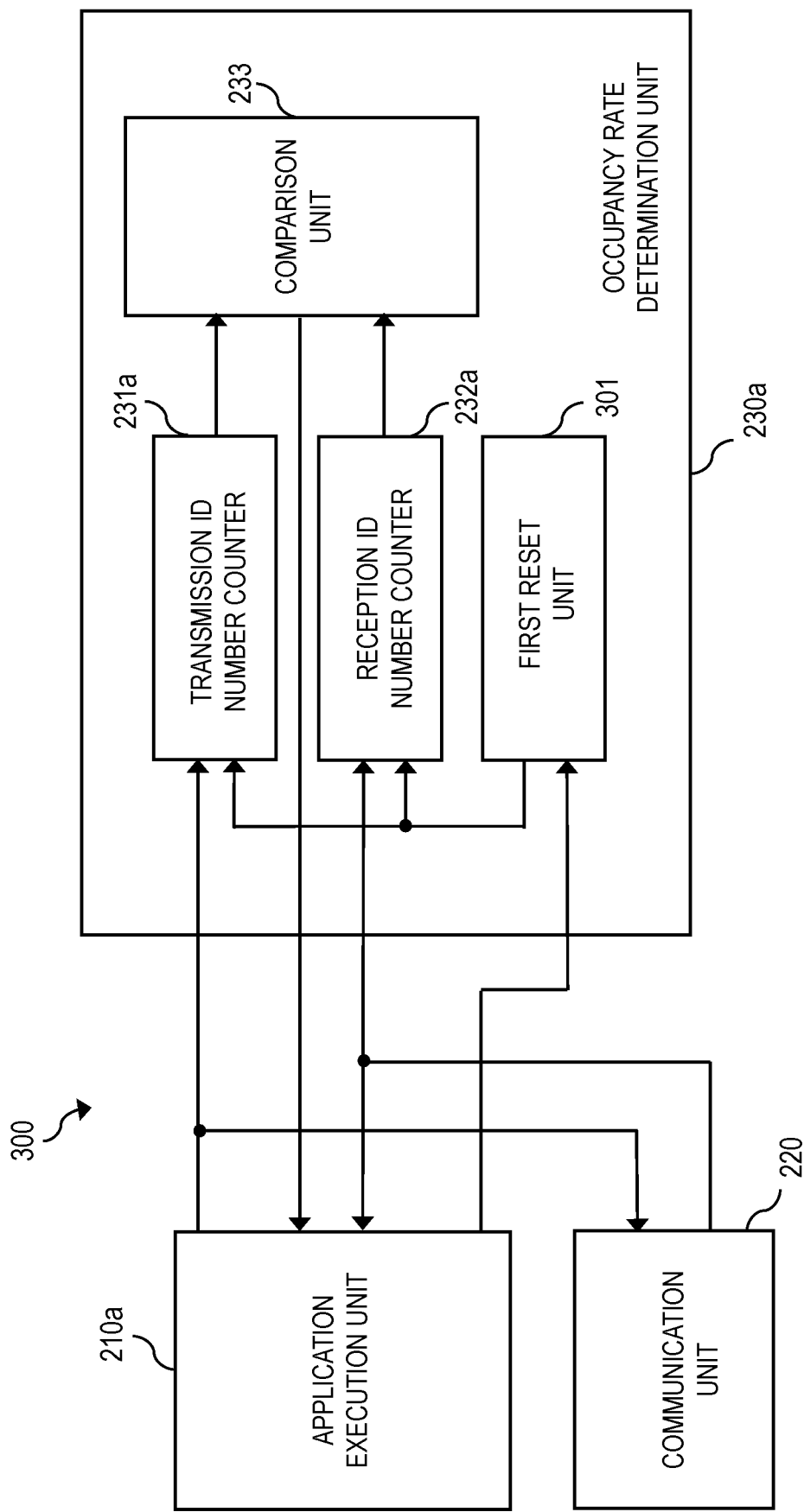
FIG. 5 is a block diagram showing an example of a configuration of a radio communication device according to a second embodiment.

Next, a second embodiment will be described. The second embodiment differs from the first embodiment in that the communication occupancy rate is determined based on the number of transmission IDs and receive IDs used within a predetermined period of time. FIG. 5 is a block diagram showing an example of a configuration of a radio communication device 300 according to the second embodiment. As shown in FIG. 5, the application execution unit 210, the occupancy rate determination unit 230, the transmission ID number counter 231, and the reception ID number counter 232 in FIG. 2 are changed to the application execution unit 210a, the occupancy rate determination unit 230a, the transmission ID number counter 231a, and the reception ID number counter 232a, respectively. The occupancy determination unit 230a includes a first reset unit 301 in addition to the configuration of the occupancy determination unit 230 shown in FIG. 2.

The first reset unit 301 is connected to the application execution unit 210a, the transmission ID number counter 231a, and the reception ID number counter 232a. The first reset unit 301 receives, as cycle information, a communication cycle required for each application from the application execution unit 210a. The application executed by the application execution unit 210a acquires information necessary for the execution from another vehicle, but the cycle in which the information needs to be updated differs depending on the application. For example, in the following application 121, since it is necessary to follow the preceding vehicle at an appropriate inter-vehicle distance, it is necessary to constantly exchange acceleration/deceleration information, and it is necessary to shorten the communication cycle. On the other hand, in the non-line-of-sight application 122, since the driver notices the warning and needs to perform appropriate processing such as deceleration, the communication cycle may be long when the distance between the vehicles has a margin for collision.

The first reset unit 301 outputs a reset signal for each application to the transmission ID number counter 231a and the reception ID number counter 232a based on the cycle information received from the application execution unit 210a. The transmission ID number counter 231a and the reception ID number counter 232a reset the transmission ID count value and the reception ID count value of the corresponding application in response to the reset signal received from the first reset unit 301. For example, when a reset signal based on cycle information according to the following application 121 is output from the first reset unit 301, the transmission ID count value and the receive ID count value of the following application 121 are reset.

As described above, according to the second embodiment, the transmission ID count value and the reception ID count value are periodically reset based on the communication cycle of the respective applications, so that the occupancy rate determination unit 230*a* can accurately determine the occupancy rate reflecting whether or not the communication occupancy rate is within a required range.

First Modification of Second Embodiment

Figure 6:
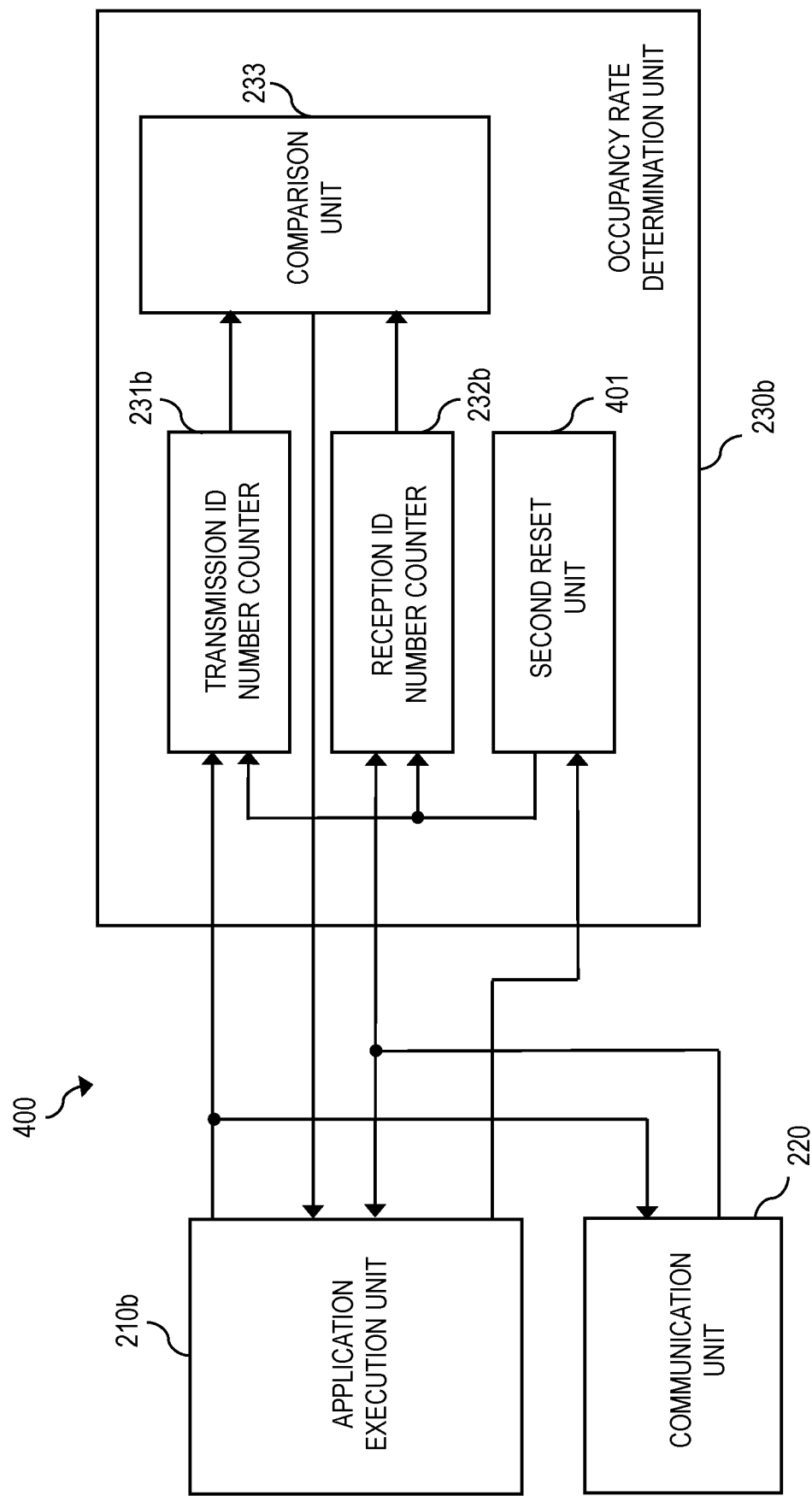
FIG. 6 is a block diagram showing an example of a configuration of a radio communication device according to the second embodiment.

Next, a first modification of the second embodiment will be described. The first modification of the second embodiment differs from the second embodiment in that a reset signal is generated based on retransmission information of transmission data. FIG. 6 is a block diagram showing an example of a configuration of a radio communication device 400 according to the first modification of the second embodiment. As shown in FIG. 6, the application execution unit 210, the occupancy rate determination unit 230, the transmission ID number counter 231, and the reception ID number counter 232 in FIG. 2 are changed to the application execution unit 210*b*, the occupancy rate determination unit 230*b*, the transmission ID number counter 231*b*, and the reception ID number counter 232*b*, respectively. The occupancy determination unit 230*b* includes a second reset unit 401 in addition to the configuration of the occupancy determination unit 230 shown in FIG. 2.

The second reset unit 401 is connected to the application execution unit 210*b*, the transmission ID number counter 231*b*, and the reception ID number counter 232*b*. The second reset unit 401 receives, as retransmission information, the number of retransmissions of transmission data for each application from the application execution unit 210*b*. In the radio communication system, the connection with the communication partner is often cut off, and the transmission data output from the application execution unit 210*b* may be notified to the application execution unit 210*b* as a transmission error. In this case, the application execution unit 210*b* retransmits the transmission data having the transmission error. The application execution unit 210*b* outputs the number of retransmissions, which is information indicating the communication stability, to the second reset unit 401 as retransmission information.

The second reset unit 401 outputs a reset signal for each application to the transmission ID number counter 231*b* and the reception ID number counter 232*b* based on the retransmission information received from the application execution unit 210*b*. The transmission ID number counter 231*b* and the reception ID number counter 232*b* reset the transmission ID count value and the reception ID count value of the corresponding application in response to the reset signal received from the second reset unit 401. For example, when a reset signal based on the retransmission information according to the following application 121 is output from the second reset unit 401, the transmission ID count value and the reception ID count value of the following application 121 are reset.

As described above, according to the first modification of the second embodiment, the transmission ID count value and the reception ID count value are periodically reset based on the retransmission cycle of the respective applications, so that the occupancy rate determination unit 230*b* can determine the occupancy rate in view of the communication stability.

Second Modification of Second Embodiment

Figure 7:
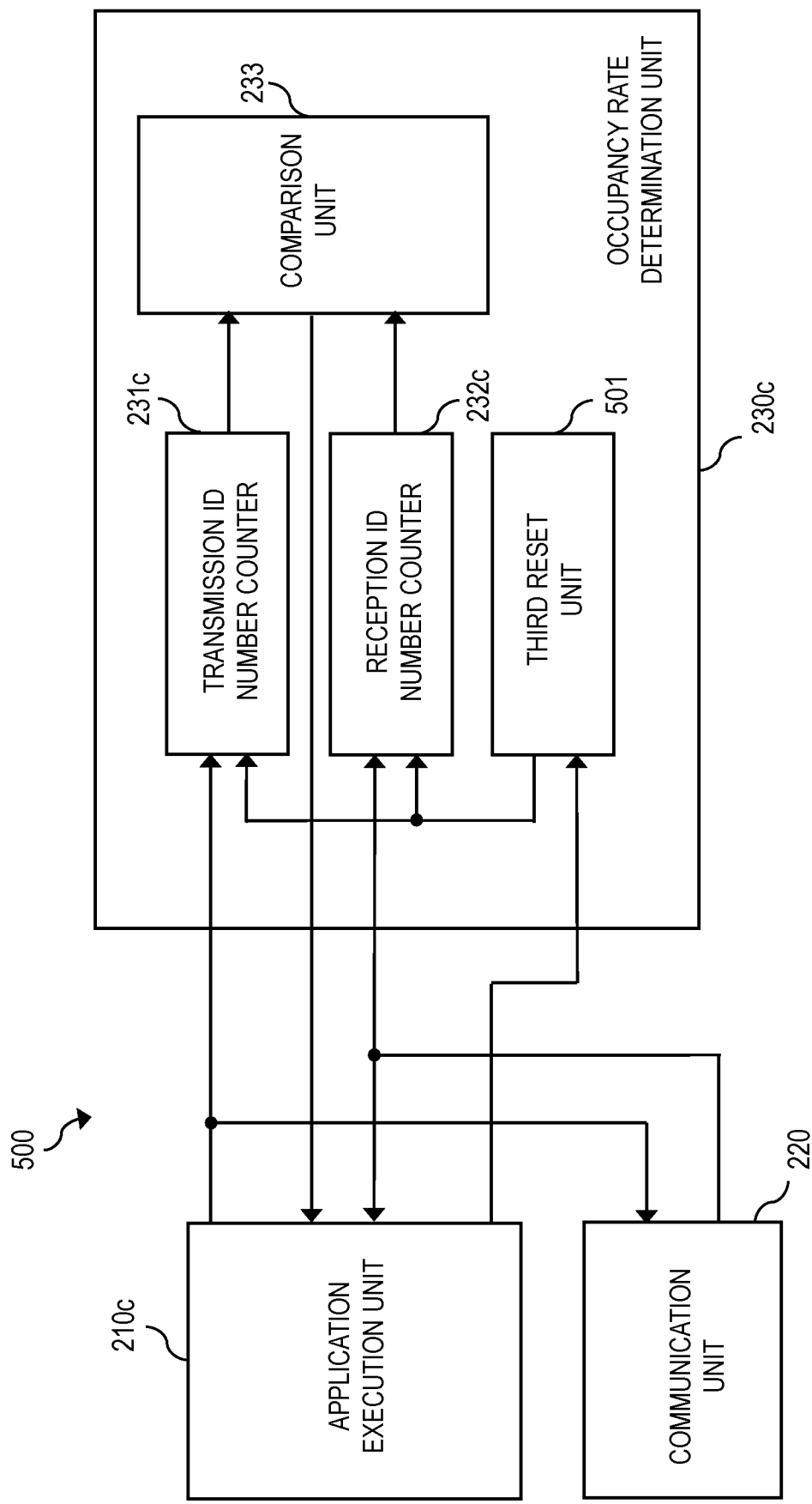
FIG. 7 is a block diagram showing an example of a configuration of a radio communication device according to the second embodiment.

Next, a second modification of the second embodiment will be described. The second modification of the second embodiment differs from the second embodiment and the first modification of the second embodiment in that a reset signal is generated based on discard ID information. FIG. 7 is a block diagram showing an example of a configuration of a radio communication device 500 according to the second modification of the second embodiment. As shown in FIG. 7, the application execution unit 210, the occupancy rate determination unit 230, the transmission ID number counter 231, and the reception ID number counter 232 in FIG. 2 are changed to the application execution unit 210*c*, the occupancy rate determination unit 230*c*, the transmission ID number counter 231*c*, and the reception ID number counter 232*c*, respectively. The occupancy determination unit 230*c* includes a third reset unit 501 in addition to the configuration of the occupancy determination unit 230 shown in FIG. 2.

The third reset unit 501 is connected to the application execution unit 210*c*, the transmission ID number counter 231*c*, and the reception ID number counter 232*c*. The third reset unit 501 receives the discard ID information from the application execution unit 210*c*. The application execution unit 210*c* determines whether the reception data is addressed to itself by referring to the application ID included in the reception data output from the communication unit 220. More specifically, the application execution unit 210*c* confirms whether or not the reception data includes the application ID according to the application being executed. When it is confirmed that the application ID according to the application being executed is included in the reception data, the application execution unit 210*c* determines that the reception data is addressed to itself. On the other hand, when it is confirmed that an application ID other than the application ID according to the application being executed is included in the reception data, the application execution unit 210*c* determines that the reception data is not addressed to itself, and discards the reception data. For example, when the application execution unit 210*c* is executing only the following application 121, the reception data including the non-line-of-sight application ID is discarded as data according to an application outside its own device. The application execution unit 210*c* outputs the discard ID information to the third reset unit 501 at the time of the discard.

The third reset unit 501 outputs a reset signal to the transmission ID number counter 231*c* and the reception ID number counter 232*c* based on the discard ID information received from the application execution unit 210*c*. The transmission ID number counter 231*c* and the reception ID number counter 232*c* reset the transmission ID count value and the reception ID count value in response to the reset signal received from the third reset unit 501.

As described above, according to the second modification of the second embodiment, the transmission ID count value and the reception ID count value are periodically reset based on the discard ID information, so that the occupancy rate determination unit 230*c* can accurately determine the occupancy rate reflecting whether or not the communication occupancy rate is within a required range.

Third Modification of Second Embodiment

Figure 8:
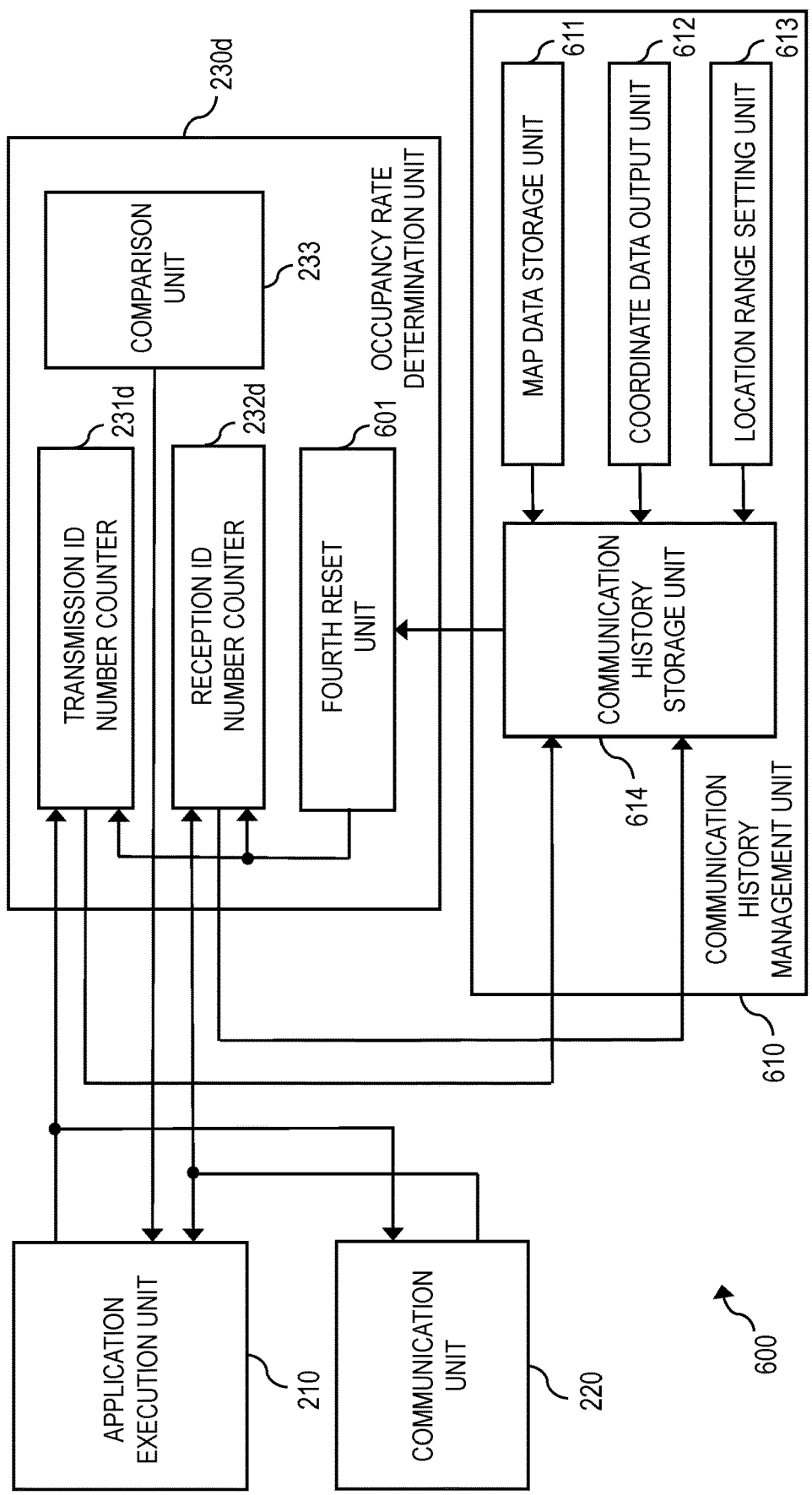
FIG. 8 is a block diagram showing an example of a configuration of a radio communication device according to the second embodiment.

Next, a third modification of the second embodiment will be described. The third modification of a second embodiment differs from the second embodiment, the first modification of the second embodiment, and the second modification of the second embodiment in that a communication history of each location is made into a database, and a reset signal is generated based on communication history information made into the database. FIG. 8 is a block diagram showing an example of a configuration of a radio communication device 600 according to the third modification of the second embodiment. As shown in FIG. 8, the occupancy rate determination unit 230, the transmission ID number counter 231, and the reception ID number counter 232 in FIG. 2 are changed to the occupancy rate determination unit 230d, the transmission ID number counter 231d, and the reception ID number counter 232d, respectively. The occupancy determination unit 230d includes a fourth reset unit 601 in addition to the configuration of the occupancy determination unit 230 shown in FIG. 2. The radio communication device 600 further includes a communication history management unit 610 in addition to the configuration of the radio communication device 111 in FIG. 2.

The communication history management unit 610 includes a map data storage unit 611, a coordinate data output unit 612, a location range setting unit 613, and a communication history storage unit 614. The map data storage unit 611 stores map data. The map data storage unit 611 is connected to the communication history storage unit 614, and outputs the map data to the communication history storage unit 614. The map data storage unit 611 does not need to store map data in advance, and may acquire map data from an Internet line via a communication module (not shown), for example. The coordinate data output unit 612 acquires coordinate data for specifying the vehicle position of the own vehicle from, for example, a Global Positioning System (GPS) module (not shown). The coordinate data output unit 612 is connected to the communication history storage unit 614, and outputs the coordinate data to the communication history storage unit 614. The location range setting unit 613 is connected to the communication history storage unit 614, and outputs setting information for setting a location to the communication history storage unit 614.

The communication history storage unit 614 is connected to the transmission ID number counter 231d and the reception ID number counter 232d. The communication history storage unit 614 receives the transmission ID count value and the reception ID count value for each application from the transmission ID number counter 231d and the reception ID number counter 232d. The communication history storage unit 614 generates location information based on the map data, the coordinate data, and the setting information. The communication history storage unit 614 stores the transmission ID count value and the reception ID count value for each application in association with the location information as the communication history information. That is, the communication history storage unit 614 makes a communication history of each application for each location into a database.

The communication history storage unit 614 is also connected to the fourth reset unit 601. The communication history storage unit 614 outputs the communication history information for each application associated with the location information to the fourth reset unit 601. The fourth reset unit 601 is connected to the transmission ID number counter 231d and the reception ID number counter 232d. The fourth reset unit 601 outputs a reset signal to the transmission ID number counter 231d and the reception ID number counter 232d based on the communication history information for each application associated with the location information. The transmission ID number counter 231d and the reception ID number counter 232d reset the transmission ID count value and the reception ID count value in response to the reset signal output from the fourth reset unit 601.

As described above, according to third modification of the second embodiment, for example, when a vehicle that has started the non-line-of-sight application 122 performs communication at a predetermined location, the vehicle resets the transmission ID count value and the reception ID count value of the non-line-of-sight application 122 based on the communication history information of the non-line-of-sight application 122 according to the predetermined location. That is, it is possible to adjust the communication frequency of the non-line-of-sight application 122 by using as information whether or not it is a place where communication of another application is likely to be performed. As a result, the non-line-of-sight application 122 can secure sufficient communication resources and perform effective communication.

The timing at which the communication history storage unit 614 updates the communication history information is not particularly limited. For example, even when the fourth reset unit 601 outputs the reset signal based on the communication history information output from the communication history storage unit 614, the communication history storage unit 614 can update the communication history information by receiving the transmission ID count value from the transmission ID number counter 231d and the reception ID count value from the reception ID number counter 232d.

In the third modification of the second embodiment described above, the communication history for each location is made into the database, but the embodiment is not limited thereto. For example, a communication history for each time can be made into a database. Furthermore, both the location and the time, that is, a communication history for each location and time, may be made into a database.

Third Embodiment

Next, a third embodiment will be described. When a radio communication device performs vehicle-to-vehicle, road-to-vehicle, and road-to-road communications, a plurality of applications may issue differing or conflicting instructions. For example, the non-line-of-sight application 122 provides a notification, for example, such as "Caution of approaching non-line-of-sight vehicle, Deceleration recommendation" when it is determined that a vehicle that is out of line-of-sight is located at a distance where there is a risk of collision. On the other hand, when the following application 121 receives the acceleration information of the preceding vehicle, the following application 121 notifies "Acceleration to keep the distance between vehicles constant". If the driver or the vehicle performing the automated driving complies with these two notifications, conflicting controls are required and cannot be carried out. In the third embodiment, a configuration and an operation of a radio communication device for solving the problem will be described.

Figure 9:
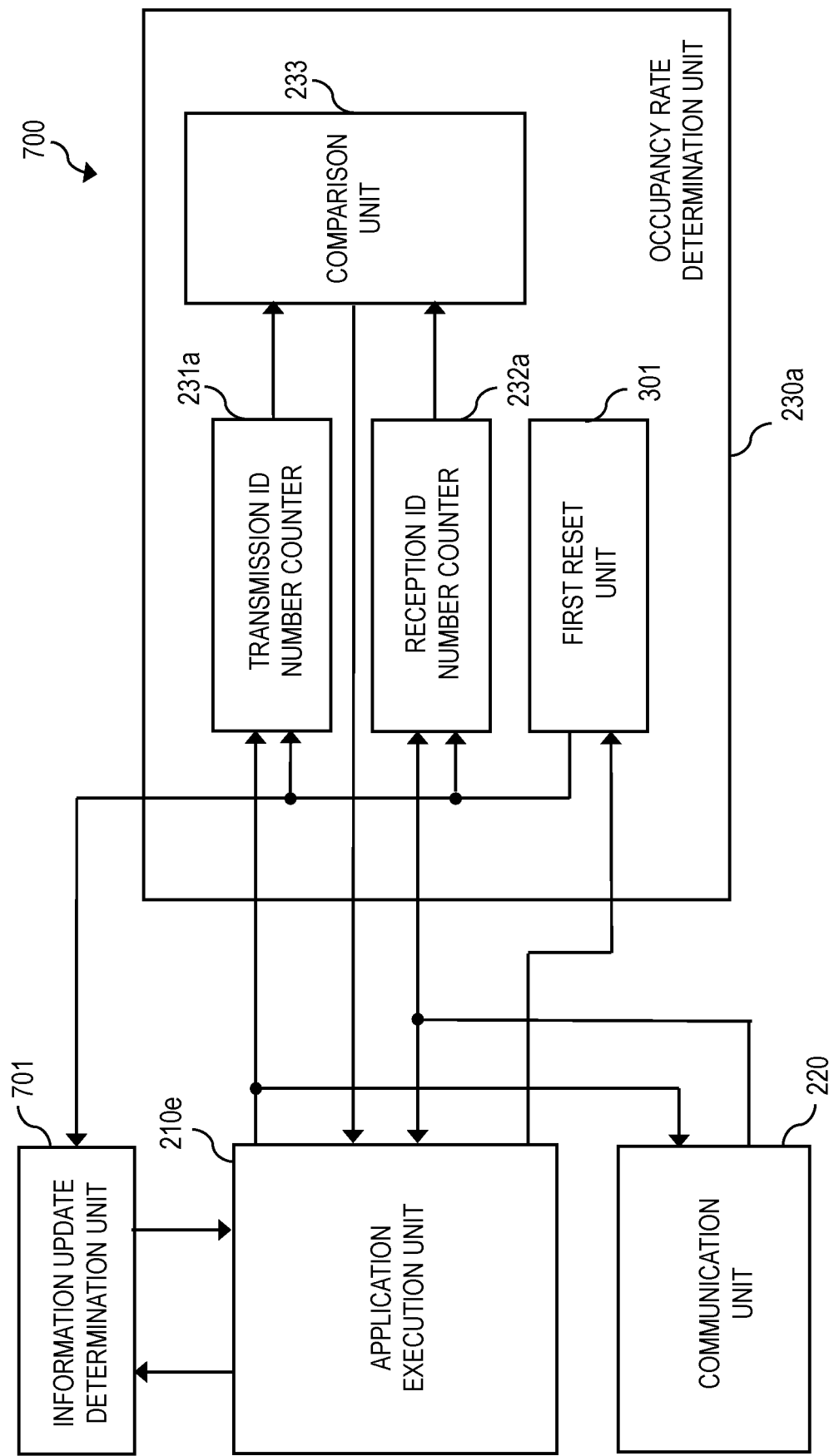
FIG. 9 is a block diagram showing an example of a configuration of a radio communication device according to a third embodiment.

FIG. 9 is a block diagram showing an example of a configuration of a radio communication device 700 according to the third embodiment. As shown in FIG. 9, the application execution unit 210a in FIG. 5 is changed to the application execution unit 210e. In addition to the configuration of the radio communication device 300 shown in FIG. 5, the radio communication device 700 includes an information update determination unit 701.

The application execution unit 210e executes a plurality of applications. The application execution unit 210e is connected to the information update determination unit 701, and outputs contents of the change to the information update determination unit 701 as an information update request for each application. For example, when the application execution unit 210e executes the following application 121 and the non-line-of-sight application 122, the application execution unit 210e outputs contents of the change according to the following application 121 and contents of the change according to the non-line-of-sight application 122 to the information update determination unit 701.

The information update determination unit 701 is connected to the first reset unit 301, and receives a reset signal indicating an information update cycle for each application. The information update determination unit 701 determines an update time for executing an information update request for each application based on a reset signal for each application output from the first reset unit 301. The information update determination unit 701 notifies the application execution unit 210e of the determined update time as an information update determination result. The application execution unit 210e outputs an information update instruction at a specified update time for each application. It is needless to say that, for example, when a plurality of applications requests conflicting control, the executable time may not be given as the information update determination result.

As described above, according to the third embodiment, the information update determination unit 701 receives information update requests from a plurality of applications, confirms these information update requests, and specifies the update time determined based on the information update cycle of each application to each application. As a result, conflicting control by a plurality of applications can be prevented, and a more stable radio communication device and radio communication system can be configured.

When the application execution unit 210e simultaneously outputs information update requests including information that cannot be matched during execution of a plurality of applications, the information update determination unit 701 can determine whether information that cannot be matched is included, and can notify the application execution unit 210e of the determination result as the information update determination result. For example, when information update requests including different current vehicle position coordinates are simultaneously output based on the processing of the following application 121 and the non-line-of-sight application 122, the information update determination unit 701 can notify the application execution unit 210e that the current vehicle position coordinates are different. In this case, the following application 121 and the non-line-of-sight application 122 may be able to confirm the accuracy (validity) of the information.

When the validity of the information cannot be confirmed by an application that can be activated in the radio communication device or the vehicle, the information may be managed, known, or repaired as failure information of the entire application using the radio communication system. In this instance, it is desirable that the radio communication device which has detected the failure communicate a message informing the failure information including the information of the target application.

In order for each application to properly receive the message informing of the failure information, a reading location or a newly determined reading location in the message is required. For example, an ID that all applications confirm may be defined in an individual service standard provided in a radio communication system as an individual service standard ID. In this case, a message including the defined individual service standard ID and information of the target application, for example, the application ID, is transmitted as a message for notifying the failure information. It should be noted that a message readable by all service standards may be obtained by assigning a dedicated individual service standard ID for failure information notification.

Figure 10:
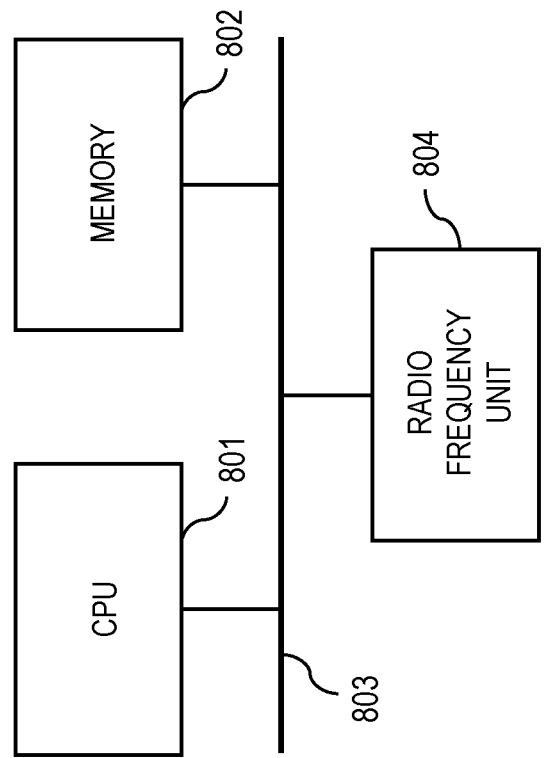
FIG. 10 is a diagram showing an example of a hardware configuration of a radio communication device.

In the first to third embodiments, the configurations and functions of the radio communication devices have been described with respect to the block diagrams of FIGS. 2, 5 to 9, but the functions of the blocks in these drawings can be configured by hardware (H/W) or software (S/W). For example, the application execution unit 210 shown in FIG. 2 can be implemented by executing application programs by a Central Processing Unit (CPU). FIG. 10 is a diagram showing an example of a H/W configuration of a radio communication device. As shown in FIG. 10, a CPU 801, a memory 802, and a radio frequency unit 804 are connected to each other via a bus 803. The application execution unit 210 of FIG. 2 can be realized by the CPU 801 reading an application program (for example, an application program according to the following application 121 or the non-line-of-sight application 122) stored in the memory 802 via the bus 803 and executing the read application program. Similarly, the communication unit 220 and the occupancy rate determination unit 230 of FIG. 2 can be realized by using all or part of the CPU 801, the memory 802, the programs stored in the memory 802, and the radio frequency unit 804.

In addition, the communication unit 220 and the occupancy rate determination unit 230 in FIG. 2 can be configured with only H/W. In this instance, for example, the communication unit 220 and the occupancy rate determination unit 230 are configured by circuits using a semiconductor device. These circuits may be formed by dividing them into a plurality of semiconductor devices or semiconductor chips, or may be formed collectively on one semiconductor device or one semiconductor chip.

Further, in the first to third embodiments, although it has been described that the radio communication device is mounted on a vehicle, the term "mounted on a vehicle" here is not limited to an aspect in which the radio communication device is incorporated in vehicle body as a part of a component. For example, an aspect in which a mobile terminal, such as a smartphone is brought into a vehicle may also be included.

Although the invention made by the present inventors has been specifically described based on the embodiments, it is needless to say that the present invention is not limited to the above-described embodiments, and various changes may be made without departing from the scope thereof.

What is claimed is:

1. A radio communication device comprising:
an application execution unit configured to execute a first application to generate first transmission data including first application identification information;
a communication unit configured to receive a message including first reception data including the first application identification information and to output the first reception data including the first application identification information; and
an occupancy rate determination unit including a transmission identification (ID) number counter configured to count the number of first application identification information included in the first transmission data and to output a count result as a first transmission ID count value, a reception ID number counter configured to count the number of first application identification information included in the first reception data and to output a count result as a first reception ID count value, and a comparison unit configured to compare the first transmission ID count value with the first reception ID count value to determine the number of transmission data and the number of reception data of the first application have a predetermined ratio, wherein the comparison unit is configured to output, as an occupancy rate determination result, a result of determining whether the number of transmission data and the number of reception data of the first application have the predetermined ratio, and wherein the application execution unit is configured to adjust a communication frequency of the first application based on the occupancy rate determination result.

2. The radio communication device according to claim 1, wherein, when the number of transmission data and the number of reception data of the first application do not have the predetermined ratio, the comparison unit is configured to:

include control of decreasing the communication frequency of the first application if the first transmission ID count value is larger than the first reception ID count value; and include control of increasing the communication frequency of the first application if the first reception ID count value is larger than the first transmission ID count value.

3. The radio communication device according to claim 1, wherein the application execution unit is configured to output cycle information indicating a communication cycle of the first application, wherein the occupancy rate determination unit further includes a first reset unit configured to output a reset signal based on the cycle information, wherein the transmission ID number counter is configured to reset the first transmission ID count value in response to the reset signal, and wherein the reception ID number counter is configured to reset the first reception ID count value in response to the reset signal.

4. The radio communication device according to claim 1, wherein the application execution unit is configured to output, as retransmission information, the number of retransmissions of the first transmission data, wherein the occupancy rate determination unit further includes a second reset unit configured to output a reset signal based on the retransmission information, wherein the transmission ID number counter is configured to reset the first transmission ID count value in response to the reset signal, and wherein the reception ID number counter is configured to reset the first reception ID count value in response to the reset signal.

5. The radio communication device according to claim 1, wherein the application execution unit is configured to output discard ID information when application identification information other than the first application identification information is included in the reception data output from the communication unit, wherein the occupancy rate determination unit further includes a third reset unit configured to output a reset signal based on the discard ID information, wherein the transmission ID number counter is configured to reset the first transmission ID count value in response to the reset signal, and wherein the reception ID number counter is configured to reset the first reception ID count value in response to the reset signal.

6. The radio communication device according to claim 1, further comprising a communication history management unit including a communication history storage unit configured to store, as first communication history information, a communication history of the first application associated with location information, wherein the occupancy rate determination unit further includes a fourth reset unit configured to output a reset signal based on the first communication history information, wherein the transmission ID number counter is configured to reset the first transmission ID count value in response to the reset signal, and wherein the reception ID number counter is configured to reset the first reception ID count value in response to the reset signal.

7. The radio communication device according to claim 6, wherein the radio communication device is mounted on a vehicle, wherein the communication history management unit comprises:

a map data storage unit configured to store map data;

a coordinate data output unit configured to output coordinate data for specifying a position of the vehicle; and a location range setting unit configured to output setting information for setting a location, wherein the communication history storage unit is configured to:

generate the location information based on the map data, the coordinate data and the setting information; and store the first transmission ID count value and the first reception ID count value which are the communication history of the first application in association with the location information.

8. The radio communication device according to claim 1, wherein the first application identification information indicates that the first transmission data and the first reception data including the first application identification information comprises data related to the first application.

9. A radio communication device comprising:

an application execution unit configured to execute a first application to generate first transmission data including first application identification information;

a communication unit configured to receive a message including first reception data including the first application identification information and to output the first reception data including the first application identification information; and an occupancy rate determination unit including a transmission identification (ID) number counter configured to count the number of first application identification information included in the first transmission data and to output a count result as a first transmission ID count value, a reception ID number counter configured to count the number of first application identification information included in the first reception data and to output a count result as a first reception ID count value, and a comparison unit configured to compare the first transmission ID count value with the first reception ID count value to determine the number of transmission data and the number of reception data of the first application have a predetermined ratio, wherein the application execution unit is configured to execute a second application to generate second transmission data including second application identification information, wherein the communication unit is configured to receive a message including second reception data including the second application identification information and to output the second reception data including the second application identification information, wherein the transmission ID number count is configured to count the number of second application identification information included in the second transmission data and to output a count result as a second transmission ID count value, wherein the reception ID number count is configured to count the number of second application identification information included in the second reception data and to output a count result as a second reception ID count value, and wherein the comparison unit is configured to compare the second transmission ID count value with the second reception ID count value to determine the number of transmission data and the number of reception data of the second application have a predetermined ratio.

10. The radio communication device according to claim 9, wherein the comparison unit is configured to:

compare the first transmission ID count value with the second transmission ID count value;

compare the first reception ID count value with the second reception ID count value; and determine whether the number of transmission data and the number of reception data between the first and second applications have respective predetermined ratios, wherein the application execution unit is configured to adjust a communication frequency of the first application or a communication frequency of the second application based on a result of determining whether the number of transmission data and the number of reception data between the first and second applications have the respective predetermined ratios.

11. The radio communication device according to claim 9, further comprising a information update determination unit, wherein the occupancy rate determination unit further includes a first reset unit configured to output a first and second reset signals, wherein the application execution unit is configured to:

output first cycle information indicating a communication cycle of the first application;

output second cycle information indicating a communication cycle of the second application;

output contents of change of the first application as a first information update request; and output contents of change of the second application as a second information update request, wherein the first reset unit is configured to:

generate the first reset signal based on the first cycle information; and generate the second reset signal based on the second cycle information, wherein the information update determination unit is configured to:

determine a first update time for executing the first information update request based on the first reset signal; and determine a second update time for executing the second information update request based on the second reset signal, wherein the application execution unit is configured to:

output an information update instruction of the first application at the first update time; and output an information update instruction of the second application at the second update time.

12. The radio communication device according to claim 11, wherein the information update determination unit is configured to determine whether information that cannot be matched is included in the first and second information update requests.

13. The radio communication device according to claim 12, wherein a message informing failure information is transmitted when the information that cannot be matched is included in the first and second information update requests is determined.

14. A radio communication system comprising:

a first vehicle on which the radio communication device according to claim 9 is mounted; and a second vehicle on which the radio communication device according to claim 9 is mounted, wherein the radio communication device mounted on the first vehicle is configured to:

transmit a message including the first transmission data to the radio communication device mounted on the second vehicle; and receive the message including the first reception data from the radio communication device mounted on the second vehicle.

15. The radio communication system according to claim 14, further comprising:

a third vehicle on which the radio communication device according to claim 9 is mounted; and a roadside device, wherein the radio communication device mounted on the second vehicle is configured to:

transmit a message including the second transmission data to the radio communication device mounted on the third vehicle via the roadside device; and receive the message including the second reception data from the radio communication device mounted on the third vehicle via the roadside device.

* * * * *